(12) United States Patent
Clem et al.

(10) Patent No.: US 11,182,814 B1
(45) Date of Patent: Nov. 23, 2021

(54) DIGITAL PROMOTION PROCESSING SYSTEM GENERATING A DIGITAL PROMOTION BASED UPON UNDERPERFORMING LOCATION AND RELATED METHODS

(71) Applicant: INMAR CLEARING, INC., Winston-Salem, NC (US)

(72) Inventors: Greg Clem, Seattle, WA (US); Jeffery Hayes, Seattle, WA (US); Lee Lovett, Springfield, PA (US); Zackary Smith, Seattle, WA (US); Ryan Halper, New York, NY (US)

(73) Assignee: INMAR CLEARING, INC., Winston-Salem, NC (US)

( * ) Notice: Subject to any disclaimer, the term of this patent is extended or adjusted under 35 U.S.C. 154(b) by 92 days.

(21) Appl. No.: 16/155,147

(22) Filed: Oct. 9, 2018

(51) Int. Cl.
G06Q 30/02 (2012.01)
H04L 12/58 (2006.01)

(52) U.S. Cl.
CPC ..... *G06Q 30/0211* (2013.01); *G06Q 30/0205* (2013.01); *G06Q 30/0239* (2013.01); *H04L 51/02* (2013.01)

(58) Field of Classification Search
CPC .......... G06Q 30/0211; G06Q 30/0223; G06Q 30/0239; G06Q 30/0205; H04L 51/02
See application file for complete search history.

(56) References Cited

U.S. PATENT DOCUMENTS

| 7,337,128 B2* | 2/2008 | Banerjee | G06Q 30/02 235/375 |
| 9,009,093 B1* | 4/2015 | Omoigui | G06Q 30/0264 706/45 |
| 9,961,204 B1* | 5/2018 | Moran | G06Q 30/016 |
| 10,956,926 B1* | 3/2021 | Clem | G06Q 30/0239 |
| 2001/0034722 A1* | 10/2001 | Tidball | G06Q 20/28 705/73 |

(Continued)

OTHER PUBLICATIONS

"Study: Chatbots deliver 25M coupons this year" (Williams, Robert—Published Nov. 15, 2017 on MarketingDive.com) (Year: 2017).*

*Primary Examiner* — James M Detweiler
(74) *Attorney, Agent, or Firm* — Allen, Dyer, Doppelt, + Gilchrist, P.A.

(57) ABSTRACT

A system for processing a digital promotion may include mobile wireless communications devices and a digital promotion server. The digital promotion server may be configured to operate a messenger bot to collect information and communicate a first digital promotion for a first product to at least one mobile wireless communications device based upon the collected information. The digital promotion server may also be configured to determine an underperforming redemption location for the first digital promotion for the first product having underperforming sales of the first product relative to other redemption locations and obtain an identification of a second product also included with the first product from transaction receipts. The digital promotion server may also be configured to generate a second digital promotion associated with the second product for redemption at the underperforming redemption location and communicate the second digital promotion to the mobile wireless communications devices.

19 Claims, 5 Drawing Sheets

(56) References Cited

U.S. PATENT DOCUMENTS

| | | | | |
|---|---|---|---|---|
| 2002/0035474 | A1* | 3/2002 | Alpdemir | G10L 15/26 704/270 |
| 2002/0065727 | A1* | 5/2002 | Enoki | G06Q 30/06 705/21 |
| 2002/0147630 | A1* | 10/2002 | Rose | G06Q 30/02 705/7.31 |
| 2004/0249510 | A1* | 12/2004 | Hanson | G06F 19/00 700/245 |
| 2005/0039136 | A1* | 2/2005 | Othmer | G06F 16/9577 715/774 |
| 2005/0239479 | A1* | 10/2005 | Bednasz | H04M 1/72572 455/456.1 |
| 2007/0179836 | A1* | 8/2007 | Juang | G06Q 30/0202 705/7.31 |
| 2012/0191629 | A1* | 7/2012 | Shae | G06F 16/332 706/11 |
| 2012/0265598 | A1* | 10/2012 | Krone | G06Q 30/02 705/14.35 |
| 2012/0271705 | A1* | 10/2012 | Postrel | G06Q 20/201 705/14.33 |
| 2013/0346150 | A1* | 12/2013 | Beddo | G06Q 10/04 705/7.31 |
| 2014/0006195 | A1* | 1/2014 | Wilson | G06Q 20/322 705/21 |
| 2014/0099886 | A1* | 4/2014 | Monroe | G06Q 20/3223 455/41.1 |
| 2014/0278855 | A1* | 9/2014 | Clark | G06Q 30/0211 705/14.13 |
| 2014/0279050 | A1 | 9/2014 | Makar et al. | |
| 2015/0095399 | A1* | 4/2015 | Mohajer Va Pesaran | H04L 67/10 709/202 |
| 2021/0150545 | A1* | 5/2021 | Wu | G06F 16/9535 |

* cited by examiner

DIGITAL PROMOTION PROCESSING SYSTEM GENERATING A DIGITAL PROMOTION BASED UPON UNDERPERFORMING LOCATION AND RELATED METHODS

TECHNICAL FIELD

The present invention relates to the field of electronics, and more particularly, to messenger bot based communications and related methods.

BACKGROUND

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

An electronic messenger program or instant messenger is a computer program that permits real time text transmission over a computer network, for example, the Internet. One type of electronic messenger program or instant messenger is a chat or messenger bot, which is a computer program that provides conversation, for example, by way of text. The conversation may mimic human conversation. A messenger bot may be particularly useful for customer service or information acquisition applications.

SUMMARY

A system for processing a digital promotion may include a plurality of mobile wireless communications devices, and a digital promotion server. The digital promotion server may be configured to operate a messenger bot to collect information and communicate a first digital promotion for a first product to at least one mobile wireless communications device based upon the collected information. The digital promotion server may also be configured to determine an underperforming redemption location for the first digital promotion for the first product having underperforming sales of the first product relative to other redemption locations, and obtain an identification of a second product also included with the first product from a plurality of transaction receipts. The digital promotion server may also be configured to generate a second digital promotion associated with the second product for redemption at the underperforming redemption location, and communicate the second digital promotion to the plurality of mobile wireless communications devices.

The digital promotion server may be configured to permit redemption of the first digital promotion for the first product at the underperforming redemption location and the other redemption locations. The digital promotion server may be configured to communicate the second digital promotion through the messenger bot, for example.

The first digital promotion may be for an entire purchase price of the first product and redeemable during a transaction for the first product at the underperforming redemption location and the other redemption locations, for example. The digital promotion server may be configured to generate aggregate sales data for the first and second products for display.

Underperforming sales may include less than an average sales volume for the first product, for example. Underperforming sales may include one of underperforming sales revenue and underperforming sales volume, for example.

The second digital promotion may have a redeemable value associated therewith, and wherein the digital promotion server may be configured to adjust the redeemable value based upon sales of the first product. The second digital promotion may have a redeemable value associated therewith, and the digital promotion server may be configured to adjust the redeemable value, for example. The information collected from the messenger bot may include at least one of a user name, social media profile, user date of birth, user geographic location, and desired product, for example.

A method aspect is directed to a method of processing a digital promotion. The method may include using a digital promotion server to operate a messenger bot to collect information and communicate a first digital promotion for a first product to at least one mobile wireless communications device from among a plurality thereof based upon the collected information and determine an underperforming redemption location for the first digital promotion for the first product having underperforming sales of the first product relative to other redemption locations. The method may also include using the processor to obtain an identification of a second product also included with the first product from a plurality of transaction receipts, and generate a second digital promotion associated with the second product for redemption at the underperforming redemption location. The method may also include using the processor to communicate the second digital promotion to the plurality of mobile wireless communications devices.

A computer readable medium aspect is directed to a non-transitory computer readable medium for processing a digital promotion. The non-transitory computer readable medium includes computer executable instructions that when executed by a processor of a digital promotion server cause the processor to perform operations. The operations may include operating a messenger bot to collect information and communicate a first digital promotion for a first product to at least one mobile wireless communications device from among a plurality thereof based upon the collected information, and determining an underperforming redemption location for the first digital promotion for the first product having underperforming sales of the first product relative to other redemption locations. The operations may also include obtaining an identification of a second product also included with the first product from a plurality of transaction receipts and generating a second digital promotion associated with the second product for redemption at the underperforming redemption location. The operations may also include communicating the second digital promotion to the plurality of mobile wireless communications devices.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
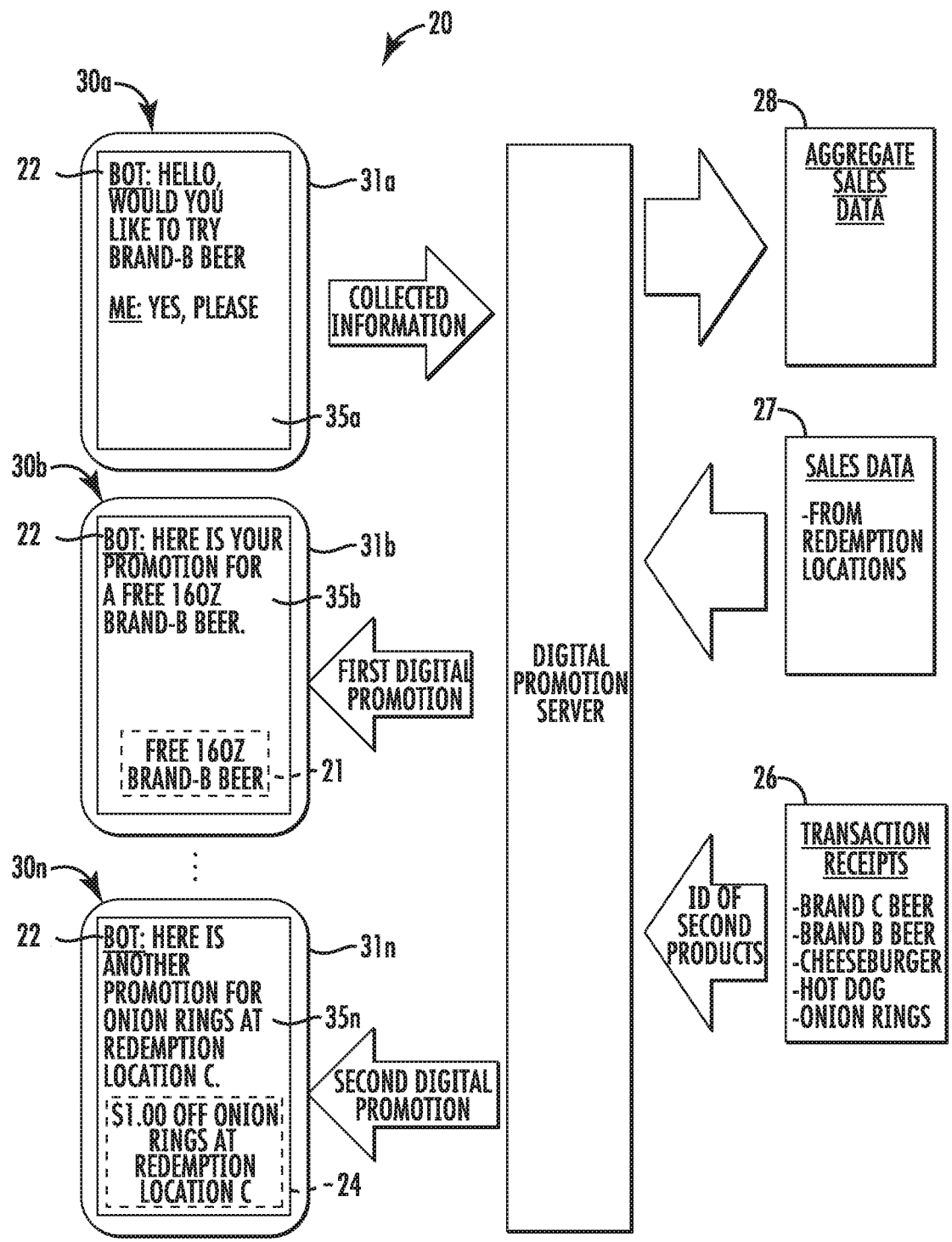
FIG. 1 is a schematic diagram of a system for processing a digital promotion in accordance with an embodiment.
Figure 2:
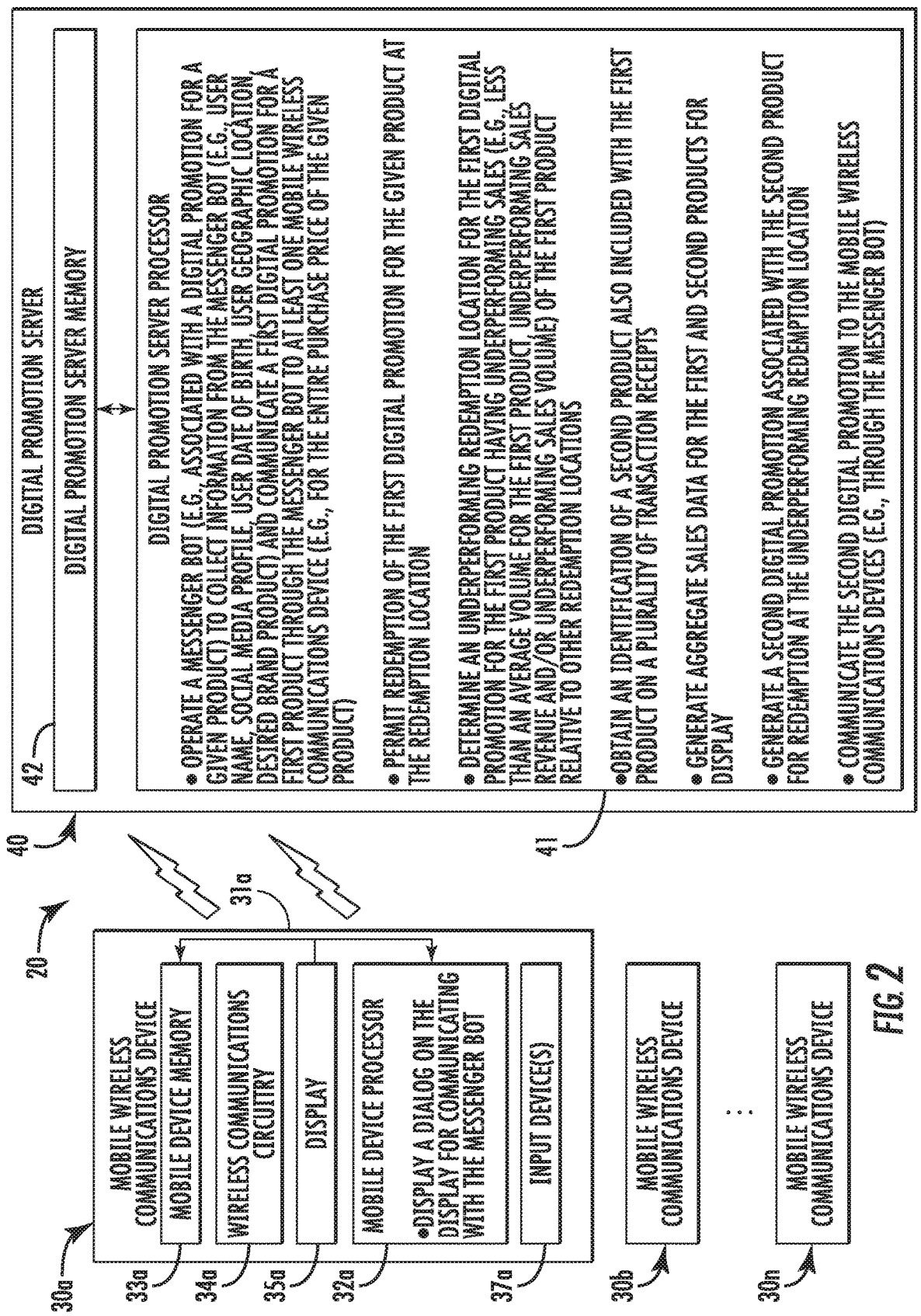
FIG. 2 is a schematic block diagram of a system for processing a digital promotion in accordance with an embodiment.

Referring initially to FIGS. 1 and 2, a system 20 for processing a digital promotion includes mobile wireless communications devices 30a-30n. Each mobile wireless communications device 30a-30n illustratively includes a portable housing 31a-31n, a mobile device processor 32a, a mobile device memory 33a coupled to the mobile device processor, and wireless communications circuitry 34a coupled to the mobile device processor. Each mobile wireless communications device 30a-30n also includes a display 35a-35n, such as, for example, a touch display, carried by the portable housing 31a and coupled to the mobile device processor 32a. Each mobile wireless communications device 30a-30n may include one or more input devices 37a and other types of output devices. Each mobile wireless communications device 30a-30n may be a mobile phone or smartphone, a tablet computer, or other type of mobile wireless communications device, as will be appreciated by those skilled in the art.

The system 20 also includes a digital promotion server 40 communicatively coupled to the mobile wireless communications devices 30a-30n. The digital promotion server 40 includes a digital promotion processor 41 and a digital promotion memory 42 coupled to the digital promotion processor. The digital promotion server 40 may be a remote computer, for example.

Figure 3:
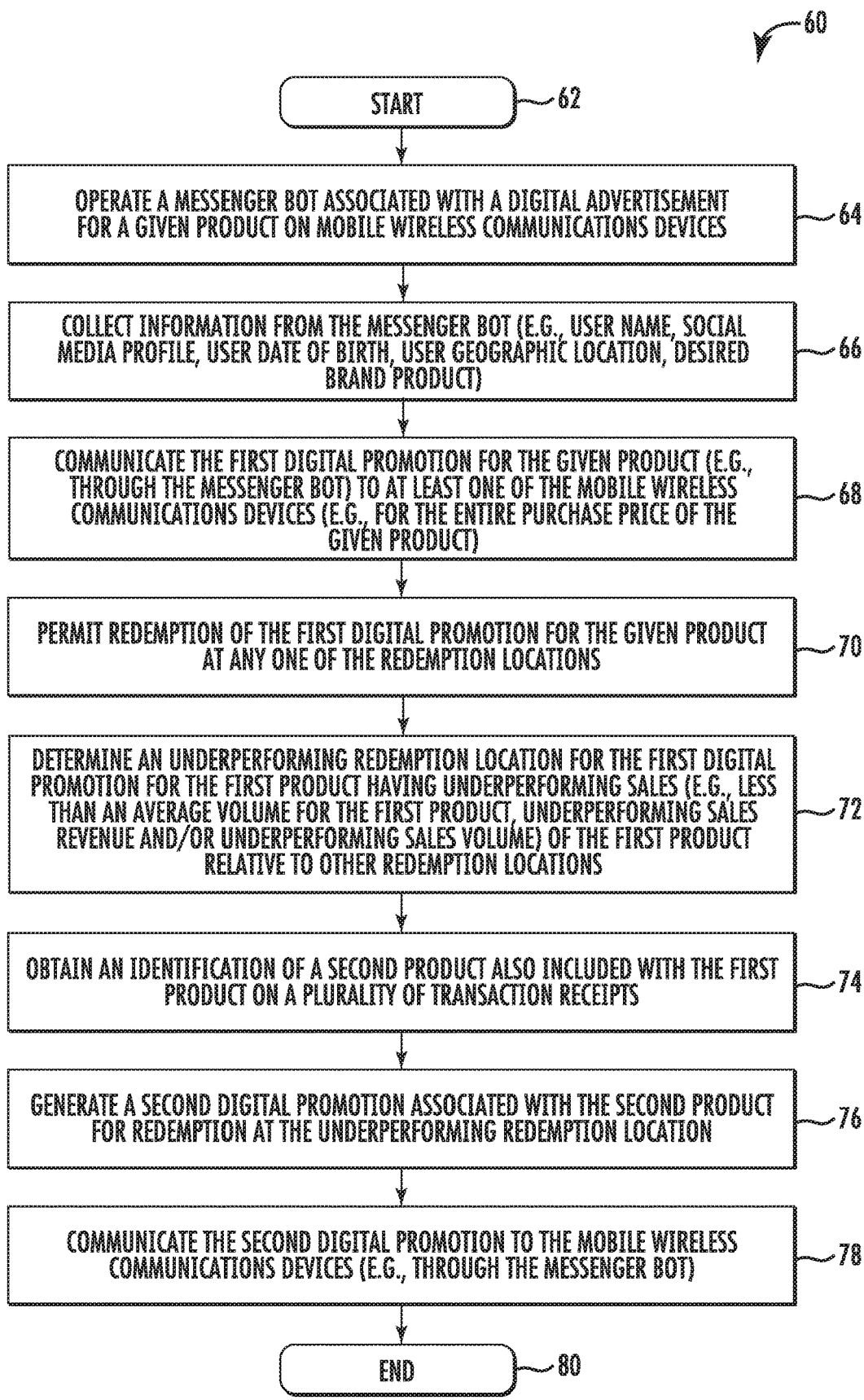
FIG. 3 is a flow chart illustrating operation of a digital promotion server of a system for processing a digital promotion in accordance with an embodiment.

Referring now additionally to the flowchart 60 in FIG. 3, details of operation of the system 20 will now be described with reference to the digital promotion server 40. Beginning at Block 62, the digital promotion server 40 operates a messenger bot 22 associated with a first digital promotion 21 for a first product on mobile wireless communications devices 30a-30n (Block 64). The first digital promotion 21 may be redeemable at one or more redemption locations, for example, a restaurant, bar, etc. Of course, the first digital promotion 21 may be redeemable at other types of locations.

The given product may be a brand and/or class or type of product, for example, and thus the messenger bot 22 may be associated with a given brand. The first digital promotion 21 may be displayed on the display 35a-35n of a mobile wireless communications device 30a-30n, for example, inline in a social media feed. An exemplary first digital promotion 21 may be along the lines of "Enjoy a Brand-B Beer On Brand-B". Of course, the first digital promotion 21 may be included on a website, in an email, and/or other electronic form.

The messenger bot 22 may be implemented in the form of a two-way dialog box that permits the given user to communicate by way of typing (i.e., written communication). In some embodiments, the messenger bot 22 may operate through voice commands or spoken words. The underlying program behind the messenger bot 22 may be a different program, application, and/or website than that serving the first digital promotion 21. For example, the first digital promotion 21 may be inline in a news feed on Facebook while the messenger bot 22 may be executed through the Facebook Messenger program or application. The application or program associated with the messenger bot 22 may be executed or opened, for example, based upon user selection of the first digital promotion 21.

At Block 66, the digital promotion server 40 collects information from or through the messenger bot 22. For example, through the messenger bot 22, the digital promotion server 40 may obtain the given user's name, social media username, email address, social media profile, date of birth, geographic location, and/or desired product from the brand. Of course, the digital promotion server 40 may collect other and/or additional types of information.

The digital promotion server 40 communicates the first digital promotion 21 for the given product (e.g., through the messenger bot 22) to at least one of the mobile wireless communications devices 30a-30n, for example, based upon the collected information (Block 68). The first digital promotion 21 may be redeemable for an entire purchase price of the given product. The digital promotion server 40 may permit redemption of the first digital promotion 21 at any one of the redemption locations (Block 70). The first digital promotion 21 may be redeemable only at selected redemption locations. In some embodiments, the digital promotion server 40 may permit redemption of the first digital promotion at other and/or additional redemption locations, for example, based upon selection from the given user.

In some embodiments, the digital promotion server 40 and the mobile wireless communications device 30a-30n may cooperate to save the first digital promotion 21 in a digital wallet associated with the user, for example, at either or both the mobile device memory 33a and the digital promotion memory 42. The first digital promotion 21 may be redeemed, for example, at a point-of-sale (POS) terminal, at a selected redemption location. For example, in an exemplary implementation, the given user may have an open tab, working guest check, or working transaction receipt 26 at a given redemption location. Brand-B Beer may be on the guest check 26 and the first digital promotion 21 may be applied toward the guest check for the purchase price of the Brand-B Beer.

At Block 72, the digital promotion server 40 determines one or more underperforming redemption locations for the first digital promotion 21 for the first product having underperforming sales of the first product relative to other redemption locations. In other words, redemption locations that have relatively lower sales in terms of either or both of sales revenue and sales volume of the first product (e.g., Brand-B Beer), regardless of redemption of the first digital promotion 21, (e.g., less than an average across some or all redemption locations) are identified as underperforming. The digital promotion server 40, which may be coupled to POS systems at each redemption location, obtains sales data 27 (e.g., product identifiers, POS identifiers, pricing, transaction receipts including contents, payment information, etc.) that is used to make the determination as to which redemption locations are underperforming with respect to the first product.

At Block 74, the digital promotion server 40 obtains an identification of a second product also included with the first product on transaction receipts 26, for example, from among each of the redemption locations. With respect to the Brand-B Beer example, along with the Brand-B Beer, users may have purchased a Brand-C Beer, a hotdog, onion rings, and a double cheeseburger, all of which may be included on the transaction receipts 26. The identification may include a product identification number, for example, or other unique identifier associated with items (e.g., food and beverage).

The digital promotion server 40 determines a correlation between the purchase of the first product and other products purchased on the same transaction receipt 26 (i.e., companion products). In other words, across multiple or all redemption locations, the digital promotion server 40 may determine that users that order or purchase the first product (e.g., Brand-B Beer) also tend to purchase the second product (e.g., onion rings). The determined correlation may be used by the digital promotion server 40 as will be described in further detail below.

Figure 4:
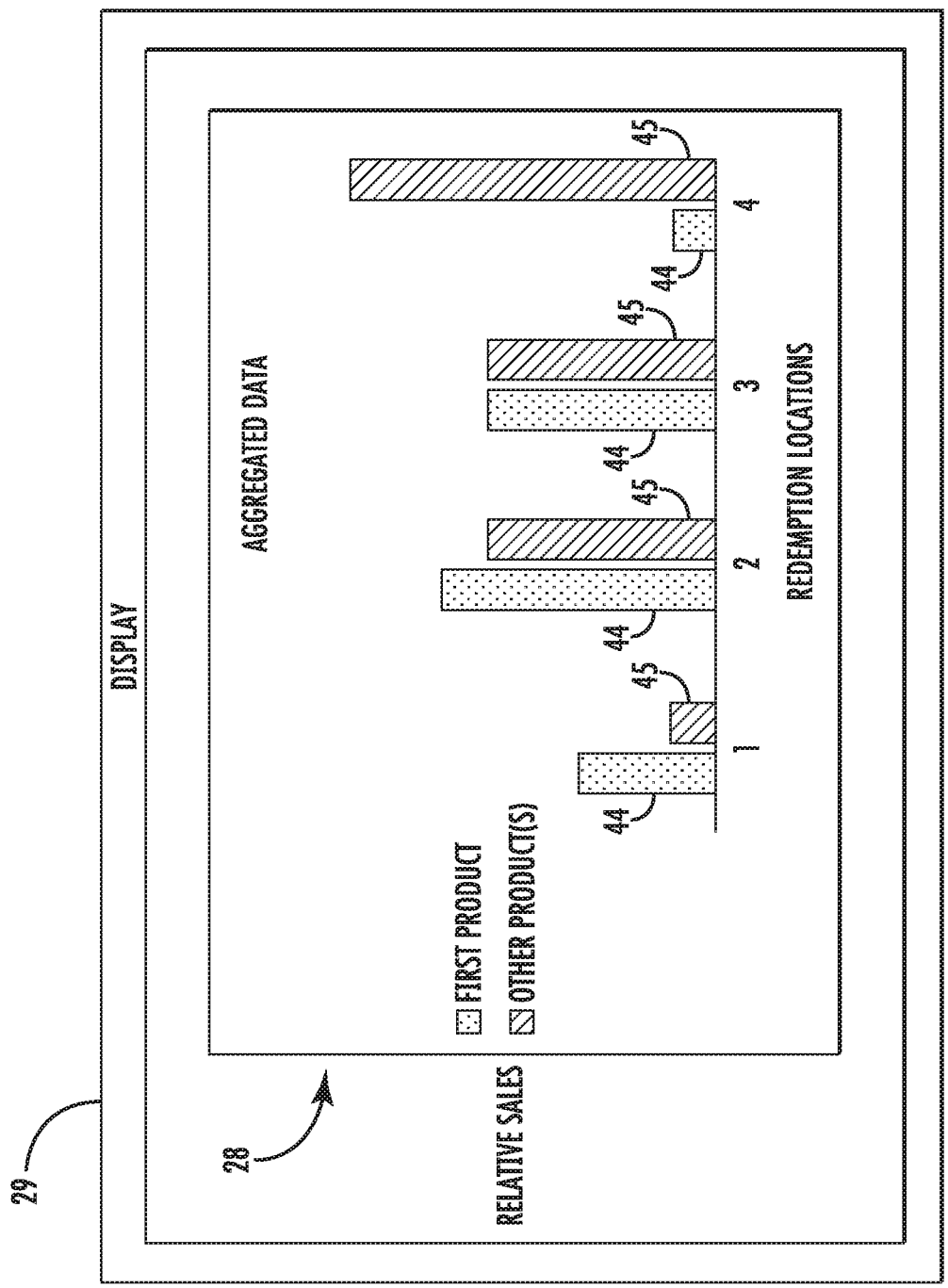
FIG. 4 is an exemplary display of data aggregated by a system for processing a digital promotion in accordance with an embodiment.

Referring briefly to FIG. 4, the digital promotion server 40, in some exemplary implementations, may aggregate sales data 27 for the first and second products for display, for example on a display 29. More particularly, the digital promotion server 40 may generate a visual representation 28 of aggregate sales data 27 for the first product 44 and other products 45 sold on the same transaction receipt 26 across redemption locations. Other data from the messenger bot 22 may be generated and aggregated. The visual representation 28 may be in the form of histograms and may be a snapshot in time of sales before communicating the second digital promotion (FIG. 4). The visual representation may also overlay, in data layers, the aggregated data for ease of visual understanding. The aggregated data and/or visual representations may be communicated to a remote device for viewing, as will be appreciated by those skilled in the art.

At Block 76, the digital promotion server 40 generates a second digital promotion 24 associated with the second product for redemption at the underperforming redemption locations. In other words, with respect to the Brand-B Beer example above, the second digital promotion 24 may be generated for onion rings at underperforming redemption locations when it is determined that there is a correlation between sales of onion rings and Brand-B Beer (i.e., those who purchase onion rings also tend to purchase Brand-B Beer). Of course, the second digital promotion 24 may be generated for another product or products on transaction receipts 26 and for which there is a correlation of sales.

The second digital promotion 24 is communicated to the mobile wireless communications devices 30a-30n (Block 78), for example, through the messenger bot 22. Similarly to the first digital promotion 21, the digital promotion server 40 and the mobile wireless communications device 30a-30n may cooperate to save the second digital promotion 24 in a digital wallet associated with the user, for example, at either or both the mobile device memory 33a and the digital promotion memory 42. The operations end at Block 80.

Figure 5:
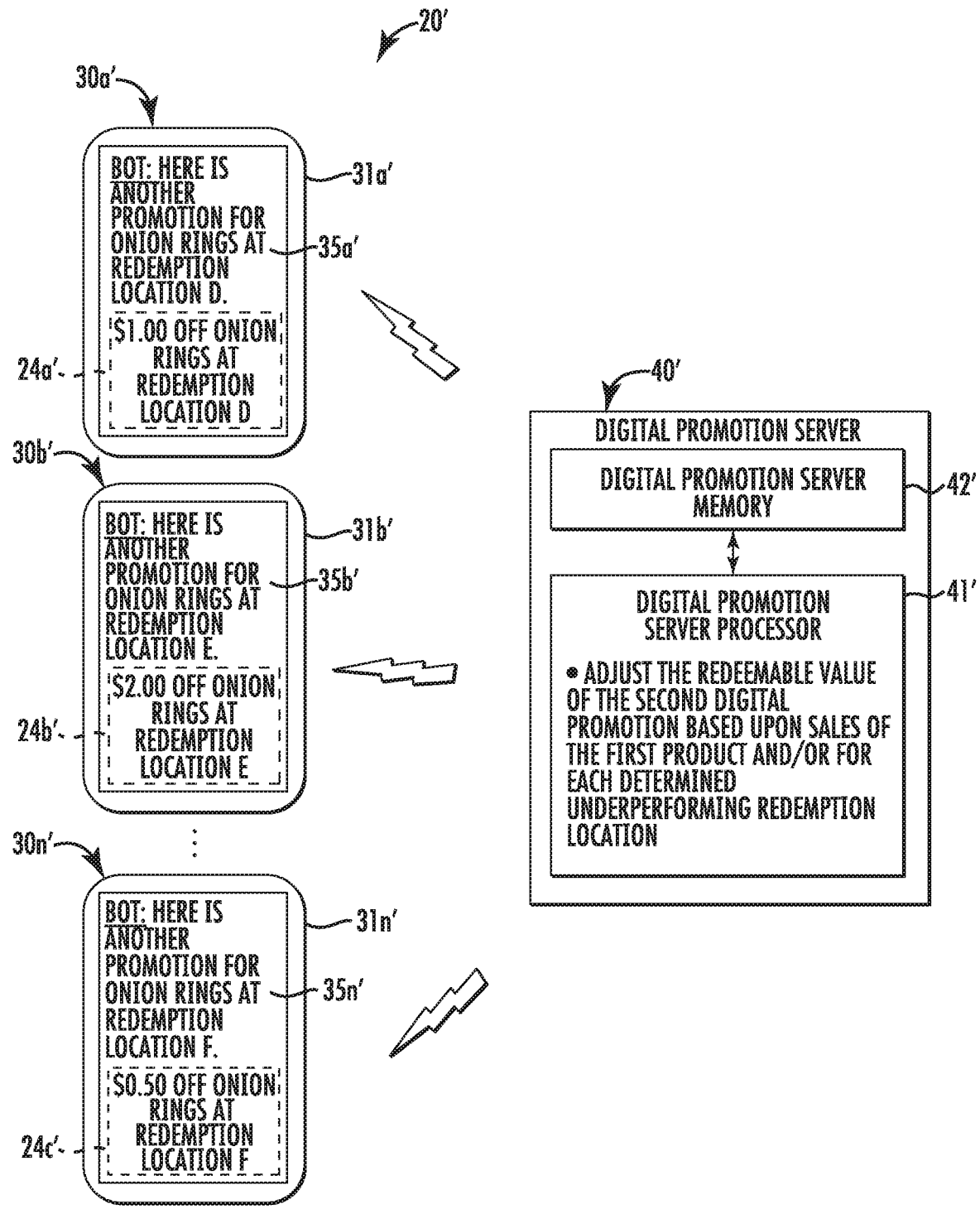
FIG. 5 is a schematic diagram of a system for processing a digital promotion in accordance with another embodiment.

Referring briefly to FIG. 5, in another embodiment of the system 20', the second digital promotion 24a'-24c' has a redeemable value associated therewith (e.g., all or less than the purchase price of the second or companion product (e.g., onion rings)). The digital promotion server 40' may adjust the redeemable value of the second digital promotion 24a'-24c' based upon sales of the first product. More particularly, the digital promotion server 40' may increase the redeemable value of the second digital promotion 24a'-24c' based upon lower sales of the first product. Alternatively or additionally, the digital promotion server 40' may adjust the redeemable value for each determined underperforming redemption location. In other words, the digital promotion server 40' may also adjust the redeemable value individually for the underperforming redemption locations and communicate respective second digital promotions 24a'-24c' to the mobile wireless communications devices 30a'-30n'. For example, the redeemable value may be higher at one more underperforming redemption location relative to other underperforming redemption locations. As such, the second digital promotions 24a'-24c' may be redeemable at selected or given ones of the underperforming redemption locations (e.g., based upon proximity to the corresponding mobile wireless communications device). Elements illustrated but not specifically described, for example, the displays 35a'-35n' and the processor 41' and the memory 42' of the digital promotion server 40', are similar to the elements described above with respect to FIGS. 1-3.

As will be appreciated by those skilled in the art, the system 20 may advantageously determine product purchase correlations across multiple locations. This may, in turn, permit advertisers to adjust spending on a given advertising campaign (e.g., for the first product) or stimulate sales of the first product at certain locations, by providing promotions for companion products (e.g., the second product(s)).

A method aspect is directed to a method of processing a digital promotion. The method includes using a digital promotion server 40 to operate a messenger bot 22 to collect information and communicate a first digital promotion 21 for a first product to at least one mobile wireless communications device 30a-30n from among a plurality thereof based upon the collected information and determine at least one underperforming redemption location for the first digital promotion for the first product having underperforming sales of the first product relative to other redemption locations. The method also includes using the processor 41 to obtain an identification of a second product also included with the first product from a plurality of transaction receipts 26 and generate a second digital promotion 24 associated with the second product for redemption at the at least one underperforming redemption location. The method also includes using the processor 41 to communicate the second digital promotion 24 to the plurality of mobile wireless communications devices 30a-30n.

A computer readable medium aspect is directed to a non-transitory computer readable medium for processing a digital promotion. The non-transitory computer readable medium includes computer executable instructions that when executed by a processor 41 of a digital promotion server 40 cause the processor to perform operations. The operations include operating a messenger bot 22 to collect information and communicate a first digital promotion 21 for a first product to at least one mobile wireless communications device 30a-30n from among a plurality thereof based upon the collected information and determining at least one underperforming redemption location for the first digital promotion for the first product having underperforming sales of the first product relative to other redemption locations. The operations also include obtaining an identification of a second product also included with the first product from a plurality of transaction receipts 26 and generating a second digital promotion 24 associated with the second product for redemption at the at least one underperforming redemption location. The operations also include communicating the second digital promotion 24 to the plurality of mobile wireless communications devices 30a-30n.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for processing a digital promotion comprising:
    a plurality of mobile wireless communications devices;
    a plurality of point-of-sale (POS) terminals at potential redemption locations; and
    a digital promotion server configured to
        operate a messenger bot implemented as a two-way dialog permitting communication from users associated with the plurality of mobile wireless communications devices to
            prompt, via the messenger bot, for a written response for the users to try a first product, and
            receive the written response to the prompt, via the messenger bot, to collect information comprising geographic locations of the users, and based upon the written response, communicate, via the messenger bot, a first digital promotion for the first product to at least one mobile wireless communications device based upon the collected information,
        cooperate with each of the plurality of POS terminals to determine underperforming redemption locations from among the potential redemption locations for the first digital promotion for the first product having underperforming sales of the first product relative to other redemption locations,
        aggregate sales data for the first and second products from the plurality of redemption locations to determine a correlation between the first product and a second product purchased with the first product based upon the first and second products appearing together on a plurality of transaction receipts, the second product being determined by learning tendencies of the users to purchase the second product with the first product based upon the plurality of transaction receipts,
        generate a second digital promotion redeemable toward the second product for redemption at the underperforming redemption locations and not redeemable at the other redemption locations, the second digital promotion having a redeemable value associated therewith,
        adjust the redeemable value of the second digital promotion based upon an amount of underperforming sales of the first product at a given underperforming redemption location relative to other underperforming redemption locations so that the second digital promotion has a higher redeemable value at underperforming redemption locations having lower underperforming sales,
        determine a geographic proximity of the plurality of mobile wireless communications devices to each of the underperforming redemption locations based upon the collected geographic locations, and
        operate the messenger bot to communicate the second digital promotion, via the messenger bot, with respective adjusted redeemable values to the plurality of mobile wireless communications devices for redemption at a corresponding underperforming redemption location based upon the determined geographic proximities to the underperforming locations.

2. The system of claim 1 wherein the digital promotion server is configured to permit redemption of the first digital promotion for the first product at the underperforming redemption location and the other redemption locations.

3. The system of claim 1 wherein the first digital promotion is for an entire purchase price of the first product and redeemable during a transaction for the first product at the underperforming redemption location and the other redemption locations.

4. The system of claim 1 wherein the digital promotion server is configured to generate the aggregated sales data for the first and second products for display.

5. The system of claim 1 wherein underperforming sales comprises less than an average sales volume for the first product.

6. The system of claim 1 wherein underperforming sales comprises one of underperforming sales revenue and underperforming sales volume.

7. The system of claim 1 wherein the information collected from the messenger bot further comprises at least one of a user name, social media profile, user date of birth, and desired product.

8. A digital promotion server for processing a digital promotion comprising:
    a memory and a processor cooperating therewith to
        operate a messenger bot implemented as a two-way dialog permitting communication from users associated with a plurality of mobile wireless communications devices to
            prompt, via the messenger bot, for a written response for the users to try a first product, and
            receive the written response to the prompt, via the messenger bot, to collect information comprising geographic locations of the users, and based upon the written response, communicate, via the messenger bot, a first digital promotion for the first product to at least one mobile wireless communications device from among the plurality thereof based upon the collected information,
        cooperate with a plurality of point-of-sale (POS) terminals at potential redemption locations to determine underperforming redemption locations for the first digital promotion for the first product having underperforming sales of the first product relative to other redemption locations,
        aggregate sales data for the first and second products from the plurality of redemption locations to determine a correlation between the first product and a second product purchased with the first product based upon the first and second products appearing together on a plurality of transaction receipts, the second product being determined by learning tendencies of the users to purchase the second product with the first product based upon the plurality of transaction receipts,
        generate a second digital promotion redeemable toward the second product for redemption at the underperforming redemption locations and not redeemable at the other redemption locations, the second digital promotion having a redeemable value associated therewith, adjust the redeemable value of the second digital promotion based upon an amount of underperforming sales of the first product at a given underperforming redemption location relative to other underperforming redemption locations so that the second digital promotion has a higher redeemable value at underperforming redemption locations having lower underperforming sales, determine a geographic proximity of the plurality of mobile wireless communications devices to each of the underperforming redemption locations based upon the collected geographic locations, and operate the messenger bot to communicate the second digital promotion, via the messenger bot, to the plurality of mobile wireless communications devices for redemption at a corresponding underperforming redemption location based upon the determined geographic proximities to the underperforming locations.

9. The digital promotion server of claim 8 wherein the processor is configured to permit redemption of the first digital promotion for the first product at the underperforming redemption location and the other redemption locations.

10. The digital promotion server of claim 8 wherein the processor is configured to generate the aggregated sales data for the first and second products for display.

11. The digital promotion server of claim 8 wherein underperforming sales comprises one of underperforming sales revenue and underperforming sales volume.

12. A method of processing a digital promotion comprising:
using a digital promotion server to
operate a messenger bot implemented as a two-way dialog permitting communication from users associated with a plurality of mobile wireless communications devices to
prompt, via the messenger bot, for a written response for the users to try a first product, and
receive the written response to the prompt, via the messenger bot, to collect information comprising geographic locations of the users, and based upon the written response, communicate, via the messenger bot, a first digital promotion for the first product to at least one mobile wireless communications device from among the plurality thereof based upon the collected information,
cooperate with each of a plurality of point-of-sale (POS) terminals at potential redemption locations to determine underperforming redemption locations from among the plurality of potential redemption locations for the first digital promotion for the first product having underperforming sales of the first product relative to other redemption locations,
aggregate sales data for the first and second products from the plurality of redemption locations to determine a correlation between the first product and a second product purchased with the first product based upon the first and second products appearing together on a plurality of transaction receipts, the second product being determined by learning tendencies of the users to purchase the second product with the first product based upon the plurality of transaction receipts, generate a second digital promotion redeemable toward the second product for redemption at the underperforming redemption locations and not redeemable at the other redemption locations, the second digital promotion having a redeemable value associated therewith, adjust the redeemable value of the second digital promotion based upon an amount of underperforming sales of the first product at a given underperforming redemption location relative to other underperforming redemption locations so that the second digital promotion has a higher redeemable value at underperforming redemption locations having lower underperforming sales, determine a geographic proximity of the plurality of mobile wireless communications devices to each of the underperforming redemption locations based upon the collected geographic locations, and operate the messenger bot to communicate the second digital promotion, via the messenger bot, to the plurality of mobile wireless communications devices for redemption at a corresponding underperforming redemption location based upon the determined geographic proximities to the underperforming locations.

13. The method of claim 12 wherein using the digital promotion server comprises using the digital promotion server to permit redemption of the first digital promotion for the first product at the underperforming redemption location and the other redemption locations.

14. The method of claim 12 wherein using the digital promotion server comprises using the digital promotion server to generate the aggregated sales data for the first and second products for display.

15. The method of claim 12 wherein underperforming sales comprises one of underperforming sales revenue and underperforming sales volume.

16. A non-transitory computer readable medium for processing a digital promotion, the non-transitory computer readable medium comprising computer executable instructions that when executed by a processor of a digital promotion server cause the processor to perform operations comprising:
operating a messenger bot implemented as a two-way dialog permitting communication from users associated with a plurality of mobile wireless communications devices to
prompt, via the messenger bot, for a written response for the users to try a first product, and
receive the written response to the prompt, via the messenger bot, to collect information comprising geographic locations of the users, and based upon the written response, communicate a first digital promotion for the first product to at least one mobile wireless communications device from among a plurality thereof based upon the collected information;
cooperating with each of a plurality of point-of-sale (POS) terminals at potential redemption locations to determine underperforming redemption locations from among the potential redemption locations for the first digital promotion for the first product having underperforming sales of the first product relative to other redemption locations;
aggregating sales data for the first and second products from the plurality of redemption locations to determine a correlation between the first product and a second product purchased with the first product based upon the first and second products appearing together on a plurality of transaction receipts, the second product being determined by learning tendencies of the users to purchase the second product with the first product based upon the plurality of transaction receipts;

generating a second digital promotion redeemable toward the second product for redemption at the underperforming redemption location and not redeemable at the other redemption locations, the second digital promotion having a redeemable value associated therewith;

adjusting the redeemable value of the second digital promotion based upon an amount of underperforming sales of the first product at a given underperforming redemption location relative to other underperforming redemption locations so that the second digital promotion has a higher redeemable value at underperforming redemption locations having lower underperforming sales;

determining a geographic proximity of the plurality of mobile wireless communications devices to each of the underperforming redemption locations based upon the collected geographic locations; and operating the messenger bot to communicate the second digital promotion, via the messenger bot, with respective adjusted redeemable values to the plurality of mobile wireless communications devices for redemption at a corresponding underperforming redemption location based upon the determined geographic proximities to the underperforming locations.

17. The non-transitory computer readable medium of claim 16 wherein the operations comprise permitting redemption of the first digital promotion for the first product at the underperforming redemption location and the other redemption locations.

18. The non-transitory computer readable medium of claim 16 wherein the operations comprise generating aggregate sales data for the first and second products for display.

19. The non-transitory computer readable medium of claim 16 wherein underperforming sales comprises one of underperforming sales revenue and underperforming sales volume.

* * * * *